(12) United States Patent
Fowler et al.

(10) Patent No.: US 9,213,220 B2
(45) Date of Patent: Dec. 15, 2015

(54) CAMERA CONTROL

(75) Inventors: Gordon Fowler, Wayland, MA (US); E. Hubbard Yonkers, Hopkinton, NH (US); Zigurd Mednieks, Harvard, MA (US)

(73) Assignee: YOUBIQ, LLC, Wayland, MA (US)

( * ) Notice: Subject to any disclaimer, the term of this patent is extended or adjusted under 35 U.S.C. 154(b) by 519 days.

(21) Appl. No.: 13/081,354

(22) Filed: Apr. 6, 2011

(65) Prior Publication Data

US 2012/0062691 A1    Mar. 15, 2012

Related U.S. Application Data

(60) Provisional application No. 61/321,297, filed on Apr. 6, 2010.

(51) Int. Cl.
| | |
|---|---|
| *G03B 17/56* | (2006.01) |
| *H04N 5/232* | (2006.01) |
| *F16M 11/10* | (2006.01) |
| *F16M 11/20* | (2006.01) |
| *F16M 11/24* | (2006.01) |
| *G03B 37/02* | (2006.01) |

(52) U.S. Cl.
CPC .............. *G03B 17/56* (2013.01); *F16M 11/10* (2013.01); *F16M 11/2014* (2013.01); *F16M 11/242* (2013.01); *G03B 17/561* (2013.01); *G03B 37/02* (2013.01); *H04N 5/232* (2013.01); *H04N 5/23203* (2013.01); *H04N 5/23216* (2013.01); *H04N 5/23238* (2013.01)

(58) Field of Classification Search
CPC .............. H04N 5/232; H04N 5/23203; H04N 5/23216; H04N 5/23238; G03B 17/56; G03B 17/561; G03B 37/02
See application file for complete search history.

(56) References Cited

U.S. PATENT DOCUMENTS

| | | | | |
|---|---|---|---|---|
| 3,870,264 | A * | 3/1975 | Robinson | 248/171 |
| 6,141,034 | A * | 10/2000 | McCutchen | 348/36 |
| 7,675,539 | B2 * | 3/2010 | Matsui | 348/14.08 |
| 2004/0109059 | A1 * | 6/2004 | Kawakita | 348/143 |
| 2006/0064273 | A1 * | 3/2006 | Sugiura et al. | 702/145 |
| 2006/0269264 | A1 | 11/2006 | Stafford et al. | |
| 2007/0019946 | A1 * | 1/2007 | Clemens | 396/322 |
| 2007/0263995 | A1 | 11/2007 | Park et al. | |
| 2009/0109279 | A1 | 4/2009 | Wang et al. | |
| 2010/0045773 | A1 | 2/2010 | Ritchey | |

* cited by examiner

*Primary Examiner* — Geepy Pe
(74) *Attorney, Agent, or Firm* — Mintz Levin Cohn Ferris Glovsky and Popeo, P.C.

(57) ABSTRACT

A system including a camera that includes a lens having an aperture, a tripod configured to support the camera, a mount configured to be coupled the tripod and to the camera, the mount including a pivot that is configured such that the camera is rotatable around an axis that is aligned with the aperture of the camera, a motor configured to control the rotation of the mount, a memory containing computer readable instructions, that when executed by a processor, cause the processor to, calculate a desired position of the camera using sensor information, control the motor such that the camera is moved to the desired position, control the shutter of the camera to capture an image, and store the captured image.

16 Claims, 10 Drawing Sheets

CAMERA CONTROL

CROSS-REFERENCE TO RELATED ACTIONS

This application claims the benefit of, prior U.S. Provisional Application No. 61/321,297, filed Apr. 6, 2010, which is incorporated by reference herein in its entirety.

BACKGROUND

Today, digital cameras have proliferated to level unimaginable only a few short years ago. Not only are digital cameras stand-alone devices, they are also features that are added to numerous electronic products. Digital cameras can now be found on, for example, portable electronic devices such as mobile phones, IPODS, and IPHONES. Typically, however, digital cameras found on portable electronic devices suffer from limitations such as limited field of view, limited resolution, and small aperture.

SUMMARY

In general, in an aspect, the embodiments of the invention may provide a system including a camera that includes a lens having an aperture, a tripod configured to support the camera, a mount configured to be coupled the tripod and to the camera, the mount including a pivot that is configured such that the camera is rotatable around an axis that is aligned with the aperture of the camera, a motor configured to control the rotation of the mount, a memory containing computer readable instructions, that when executed by a processor, cause the processor to, calculate a desired position of the camera using sensor information, control the motor such that the camera is moved to the desired position, control the shutter of the camera to capture an image, and store the captured image.

Implementations of the invention can provide one or more of the following features. The processor is included in the camera. The motor is configured to control the rotation of the mount around a vertical axis that is aligned with the aperture of the camera. The computer readable instructions are further configured to cause the processor to capture a plurality of images that are combinable to create a composite image. The composite image is selected from the group consisting of a panoramic image, a cylindrical image, a spherical image, and a high dynamic range image. The computer readable instructions are further configured to cause the processor to combine the plurality of images to create a composite image.

In general, in another aspect, embodiments of the invention may provide a non-transitory computer readable medium including computer readable instructions that, when executed by a processor, are configured to cause the processor to control the operation of a camera, collect information from a sensor in the camera, process the sensor information to calculate a position of the camera, control a motor attached to the camera to position the camera using the calculated position, wherein the motor is configured to rotate the camera around an axis that is aligned with an aperture of the camera, capture an image using the camera, and store the captured image.

Implementations of the invention can provide one or more of the following features. The computer readable instructions are executed in a processor included in the camera. Controlling the motor includes controlling the rotation of the camera around a vertical axis that is aligned with the aperture of the camera. The computer readable instructions are further configured to cause the processor to capture a plurality of images that are combinable to create a composite image. The computer readable instructions are further configured to cause the processor to create a plurality of images that are combinable into at least one of a panoramic image, a cylindrical image, an spherical image, and a high dynamic range image. The computer readable instructions are further configured to cause the processor to combine the plurality of images to create a composite image.

Various aspects of the invention may provide one or more of the following capabilities. Multi-picture composite images can be created. Panoramic, cylindrical, and spherical images can be captured. A camera can be automatically controlled and positioned using an image application. A camera can provide information to an image application that is used to control the camera. Images captured by the camera can be stored remotely in the cloud. A user can be provided guidance of how to capture successive images used to create a multi-picture composite image. Images captured by the camera can be backed up by automatically synchronizing uploading the images to a storage location using any available communications wireless network.

These and other capabilities of the invention, along with the invention itself, will be more fully understood after a review of the following figures, detailed description, and claims.

DETAILED DESCRIPTION

Embodiments of the invention provide techniques for capturing images using a smartphone. In one embodiment, the smartphone is supported on a mount that is configured such that the smartphone can rotate about several axes that aligned with the focal plane/point of a camera included in the smart phone. Some embodiments include a motorized mount that can be configured to automatically rotate the smartphone to capture images in an automated fashion. An image capture application can also be provided that is configured to work with and control the mount and to control the smartphone to capture images. The image capture application can be configured automatically capture a series of images using the smartphone that can be combined into a single image. The image capture application can also be configured to automatically copy media files to a remote storage location. The image capture application can also be configured to allow a user to edit and/or manipulate images captured by the smart phone. The image capture application can also be configured to register the date, time, location, direction, and camera orientation of every image and/or video that is captured. This information can then be attached to photographs and videos that are captured such that it can easily be organized and searched at a later time. Other embodiments are within the scope of the invention.

Figure 1:
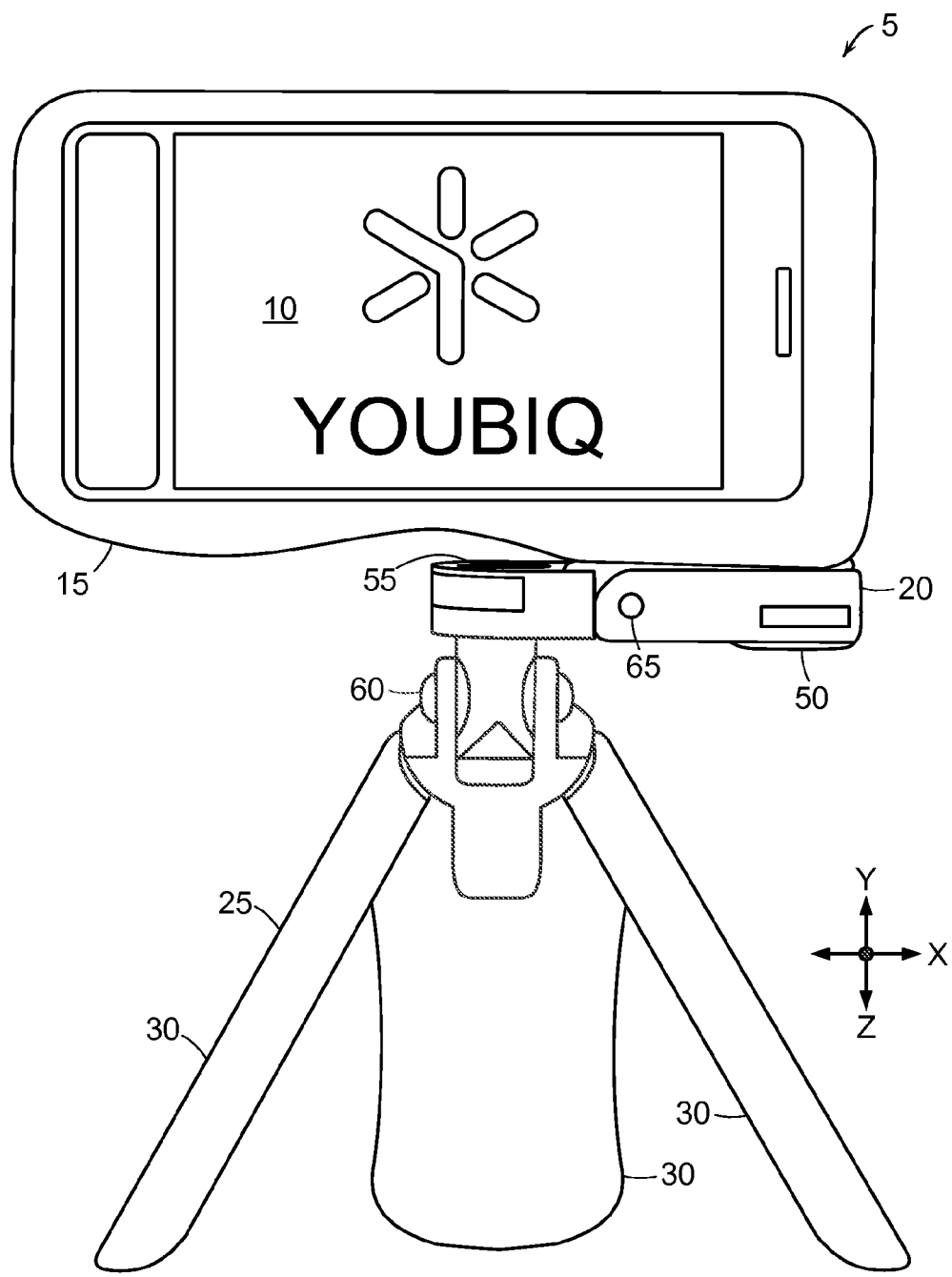
FIG. 1 is a diagram of a system for capturing images.

Referring to FIGS. 1-6, an exemplary system 5 includes a camera 10, a case 15, a mount 20, and a tripod 25. While FIG. 1 shows an APPLE IPHONE as the camera 10, other cameras can be used.

The camera 10 is preferably a smart camera that is configured to take pictures and/or capture video. The camera 10 preferably includes a microprocessor on which a third-party application can be executed. The camera 10 can be a standalone camera or can be part of another device such as, a smart phone, MP3 player, or tablet PC. Examples of the camera 10 are APPLE IPHONE, APPLE IPAD, RIM BLACKBERRY, APPLE IPOD, and DROID INCREDIBLE. Preferably, the camera 10 can be configured to download and execute applications provided by third parties (e.g., via an Internet connection). For example, the APPLE IPHONE is configured to download applications from an application store. The combination of the camera functionality and the ability to execute third-party applications can create novel functionality and enable users to create images of varying quality and type that can be shared online.

The mount 20 is preferably configured to connect to the camera 10 such that the mount 20 can support and/or maneuver the camera 10. The mount 20 can connect directly to a fitting in the camera 10, and/or can use an adapter such as a case 15 that is configured to fit the camera 10. Preferably, the mount 20 includes one or more gimbals that are configured such that it creates two rotational planes that intersect at the aperture and/or focal plane of the lens of the camera 10. In this configuration, parallax that results from rotation of the camera 10 can be reduced or eliminated. The mount 20 can be set on a stable surface and/or can be used in conjunction with a tripod (or other hardware used to eliminate vibrations) to provide manual and/or motorized control of the rotation of the camera 10. The mount 20 can also function as a handle for the camera 10.

An exemplary version of the mount 20 includes pivots 50, 55, 60, 65 that are configured to pivot along different axes. For example, pivots 50 and 55 are configured to allow the camera 10 to rotate about the y-axis, the pivot 60 is configured to allow the camera 10 to rotate about the x-axis, and the pivot 65 is configured to allow the camera 10 to rotate about the z-axis. The pivots 50, 55, 60, 65 can be configured to be locked in position (e.g., using a lever). The pivots 50, 55, 60, 65 can also include one or more mechanical detents at one or more predefined locations (e.g., at 45 and 90 degrees).

The mount 20 can also include one or more motors 70 that are configured to rotate the camera 10 under the control of a computerized application. Preferably, the motors used to rotate the camera 10 are small motors requiring little electrical power. The motor can be configured to rotate the camera 10 on one or more pivot points of the mount 20 (e.g., x, y, and z axes). Preferably, power is provided to the motor by a battery pack 75, and/or an external power connection. Motorized embodiments of the mount 20 can be configured in various ways. For example, there can be a single motor 70 configured to rotate the camera 10 about a single axis or multiple motors 70 can be used to rotate the camera 10 about more than one axis. For example, a panorama mount can automate image capture in the horizontal plane while the vertical panning/tilt angle can be adjusted manually to capture a virtual reality or spherical image. A virtual reality mount can be motorized on both the vertical and horizontal plane and can fully automate capturing a spherical image.

The mount 20 can be configured to communicate with one or more other devices. For example, the mount 20 can be configured to communicate with the camera 10, a remote computer, and/or remote control using a wireless (e.g., Infrared, Bluetooth, 802.11, etc) and/or wired connection (e.g., a multi-pin connector). The remote control can be, for example, a small traditional handheld unit, or another processor such as a smart phone, PC, and/or tablet PC operating a control application. The communication connections can be used to control the mount 20 (e.g., to control the direction and speed of movement in the vertical and/or horizontal planes) and/or to control the camera 10 itself (e.g., to control the parameters of image capture). The camera 10 can also use the connection with the mount 20 to provide information collected by sensors in the camera 10. For example, the camera 10 can provide information captured by onboard sensors (e.g., a gyroscope, clock, GPS receiver, and/or compass).

The mount 20 and/or the camera 10 can be configured to be controlled by a remote control 80. For example, the remote control 80 can be used to remotely control how and when the camera 10 takes a picture. The remote control 80 can also be used to control the movement of a motorized version of the mount 20. The remote control 80 can also be used for "follow me" functionality where the mount 20 is configured to automatically point the camera at the remote so that, for example, the person holding the remote control 80 is always in the picture and/or video being captured by the camera 10. The remote control can also be configured to snap to the mount 20 when not in use.

The mount 20 can include additional features that make control of the camera 10 easier. For example, the mount 20 can include a detent on the pivot for the vertical plane that can lock the camera 10 in position to simplify initial setup. This can be used in conjunction with, for example, an electronic version of a bubble level in an image application and can be used to level the mount when adjusting a tripod or other camera stabilization device. The mount 20 can also be configured to easily switch the camera 10 between portrait and landscape modes.

Figure 6:
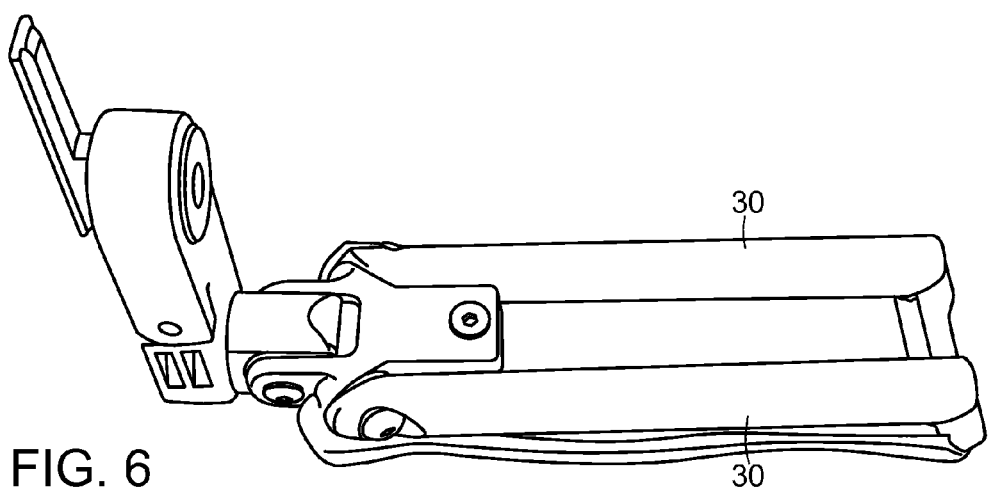
FIG. 6 is a diagram of a portion of the system shown in FIG. 1.
Figure 7:
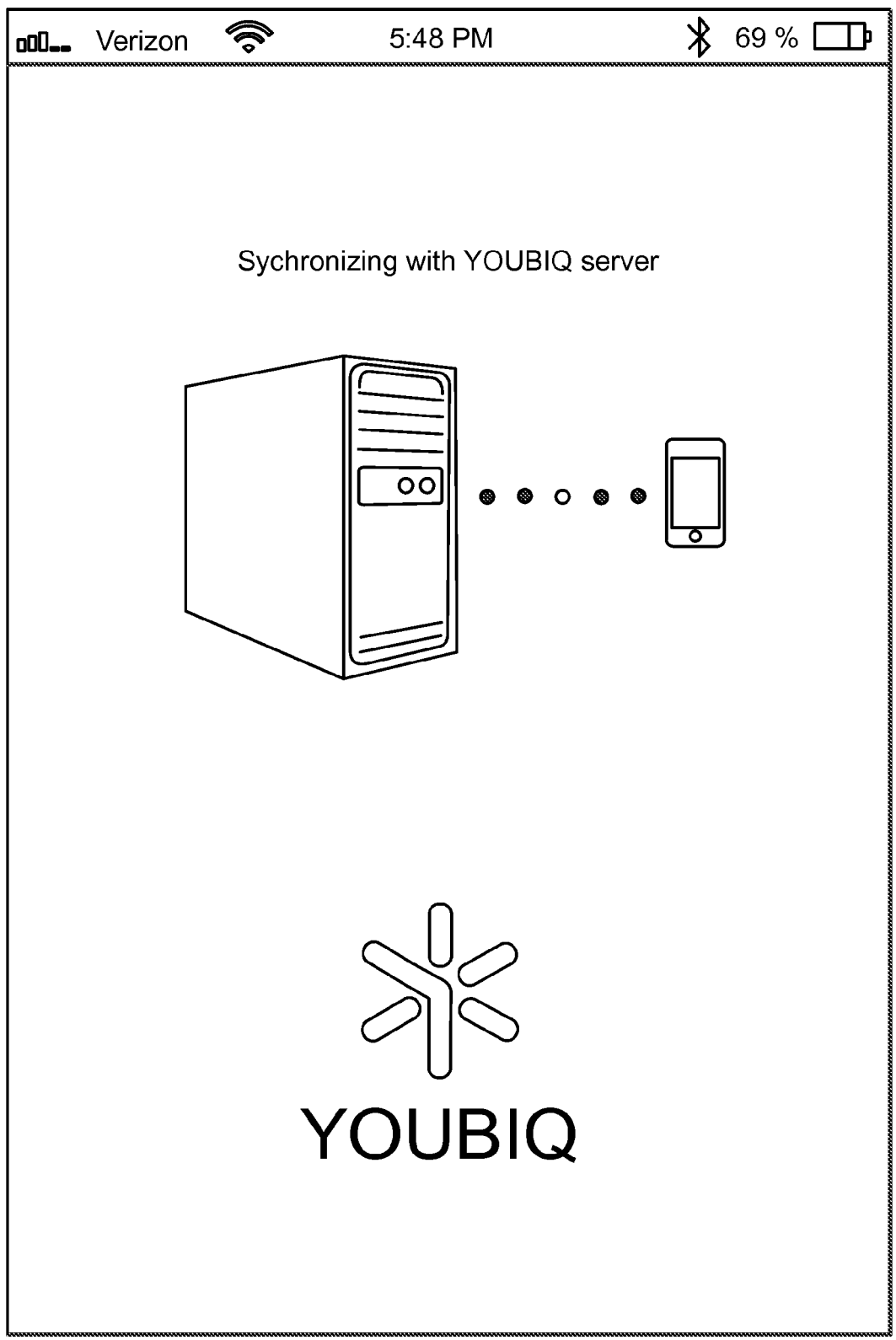
FIGS. 7-11 are exemplary screen shots of a computer application for use with a camera.

The tripod 25 can be a standard tripod. For example, the tripod 25 can include legs 30 that are used to support to stabilize the camera 10. The mount 20 and/or tripod 25 can also be configured to function as a handle when not being used to support the camera 10. One of the three legs of the tripod can be configured as a larger leg such that the other two smaller legs, when folded, fit inside the larger leg (e.g., as shown in FIG. 6). The tripod 25 can also include a power source used to power the mount 20 (e.g., battery pack).

The system 5 is preferably configured to work with an image application. The image application can be executed by the camera 10 and/or another processor (e.g., a remote computer). The user can preferably interface with the image application via a display on the camera 10 and/or via an external display. The image application can preferably be used to control the camera 10 and/or the mount 20. The image application can also preferably be used to receive images captured by the camera 10 and to process the same. The image application can also be configured to allow user to edit images captured by the camera 10. The image application can be, for example, an application that is configured to run on an APPLE IPHONE. The image application can be configured to communicate with network servers via a wired and/or wireless network connection (e.g., a 3G connection provided by a cellular service provider). The image application can be configured to process and upload images captured by the camera 10. For example, in a cloud computing system, the image application can be configured to upload images to a remote server in the cloud. The image application can also be configured to automatically communicate with a remote network-based application that can process images and can be used for editing by the user.

The image application can be configured to use information provided by the camera 10 to control the camera 10. For example, the image application can be configured to receive information from sensors contained in the camera 10 to control the camera 10 and/or the mount 20. For example, the image application can be configured to use location information, GPS information, azimuth, orientation, brightness, acceleration, and sound to control the camera 10. The image application can be configured to receive sensor information from the camera 10 that can be used to calculate the position of the camera 10. Using the position information, the image application can be configured to control the camera 10 to, for example, take a series of consecutive images that can then be stitched together later to create a panoramic image.

In one example, the image application can be configured to control the capture of photos by the camera 10. The image application can be configured to use additional information to control the parameters of the image capture itself (e.g., using brightness information provided by the camera 10 to control shutter speed and aperture of the camera 10). For example, the focus, aperture, and shutter speed of the camera 10 can be set to custom values based on algorithms that evaluate the image and/or can be based on controls and readings available to the camera 10. The image application can be configured to use many different types of information in order to control the camera 10. For example, the image application can use information provided by the camera 10 (e.g., GPS information, brightness information, field of view, aperture, shutter speed, focus, gyroscope information, orientation information, etc.).

The image application can be configured to take multiple images that are combined to create a processed picture such as a panoramic, cylindrical, spherical, high dynamic range (HDR), and virtual reality images. This process can be improved by the fact that the mount 20 rotates about axes that are aligned with one or more focal planes of the camera 10. The image application can be configured to process the multiple images on the camera 10 and/or at a remote computer (e.g., a remote webpage or using third-party image editing software). Sensor data from the camera 10 can be added to the images (e.g., as metadata) that are collected by the camera 10 order to combine the multiple images, and/or for other processing. As an example, azimuth and GPS information can be used by mapping software to show the direction the camera was pointed when an image was captured. Other metadata can be included as well, such as time, date, latitude, longitude, shutter speed, aperture, white balance, lens information, etc.

The image application can be configured to capture a panoramic, cylindrical, and/or spherical image by collecting and combining multiple images taken by the camera 10. Preferably, the image application uses field of view information provided by the camera 10 to determine where to position the camera 10 to collect all of the images that are used to create a completed panoramic, cylindrical, and/or spherical image. For example, the image application can be configured to control the mount 20 such that all of the images used to create a final panoramic, cylindrical, and/or spherical image are automatically collected. In addition, the image application can also be configured to provide feedback to the user of the camera 10 to indicate where to move the camera 10 to capture each of the images used to create a final panoramic, cylindrical, and/or spherical image. For example, audible and/or physical indications can be used to alert the user of the camera 10 where the next image should be taken.

The image application can be configured to control the camera 10 and/or mount 20 via, for example, a wired and/or wireless connection. For example, each of the following types of connections can be used: a charging/base connector, a Bluetooth connection, a WiFi connection, an infrared transceiver, a headset jack in the camera 10 (e.g., using the Left/right/common/ground leads), and/or other proprietary connectors. The headset jack, if present on the camera 10, can also be connected to an infrared transceiver and used to control the camera 10 and/or mount 20. Audio signals created by the camera 10 can also be used as a wireless link to control the mount 20.

The image application, camera 10, and/or mount 20 can be configured for "follow-me" operation. In one example of follow me operation, facial recognition can be used to track the location of a person. In another example of follow me operation, a remote control can be configured to emit a beacon of light that can be used to track the location of the remote control (e.g., keeping the beacon in the center of the frame). The light can be at any wavelength that can be detected by sensors used with the image application and/or camera 10. The sensors can include, for example, sensors configured to detect UV and IR bands of electromagnetic radiation.

The image application can be configured to provide a setup mode. In the setup mode, the camera 10 is preferably oriented flat and a bubble level utilizing sensors in the camera 10 can be used to level the camera by adjusting, for example, the head of a tripod.

The image application can be configured to work in various configurations. In a first exemplary configuration, the image application can be executed locally on the camera 10 and use the memory contained in the camera 10 to store images. Preferably, in this configuration, the image application is executed locally on the camera 10 and the user is able to interface with the image application using the camera 10 (e.g., via a touchscreen interface on the camera 10). The user of the camera 10 can preferably take and edit pictures using the camera 10, and can preferably store pictures in a memory contained in the camera 10.

In a second exemplary configuration, the image application can be executed locally on the camera 10 and use a remote memory (e.g., in the cloud) to store images. In this configuration, image application is preferably executed locally on the camera 10 and the user is able interface with the image application using the camera 10 (e.g., via a touchscreen interface on the camera 10). The user can preferably use the image application to take and edit pictures using the camera 10. The image application is preferably configured such that the user can store pictures taken and/or edited by the camera 10 in a remotely located memory (e.g., in the cloud). For example, the remotely located memory can be a hard drive that is located in a server that is accessible via the Internet.

In a third exemplary configuration, the image application can be executed remotely from the camera 10 (e.g., in a server in the cloud) and can use a memory that is located remotely from the camera 10 (e.g., a memory in the cloud) to store images. In this configuration, the image application is preferably executed on a remotely located processor. For example, the processor can be in physical proximity with the camera 10 and/or accessible over the Internet (e.g., via a webpage). The user of the camera 10 can interact with the image application via, for example, a computing device having a network connection capable of communicating with the computer executing the image application. Using the image application, the user can cause the camera 10 to take pictures. The user can also preferably edit previously taken pictures and store those pictures in a remotely located memory (e.g., in the cloud).

The image application can be configured to allow users to customize and save a set of standard image profiles. These image profiles can be uploaded to the cloud to enable a user to access the image profiles regardless of the location of the user. Preferably, the image profiles can also be edited online and downloaded (or pushed) to the image application. To the extent that multiple users have created image profiles and save these to a centrally located server, data mining applications in the centrally located server can be configured to use the save profiles to refine the default settings of the image application.

Image Application Functional Specification

The following paragraphs describe one exemplary method of operation of the image application. The exemplary method of operation may be altered by, for example, removing certain functionality and/or adding additional functionality. Exemplary screen shots of the image application are shown in FIGS. 7-11).

Splash Screen

Figure 2:
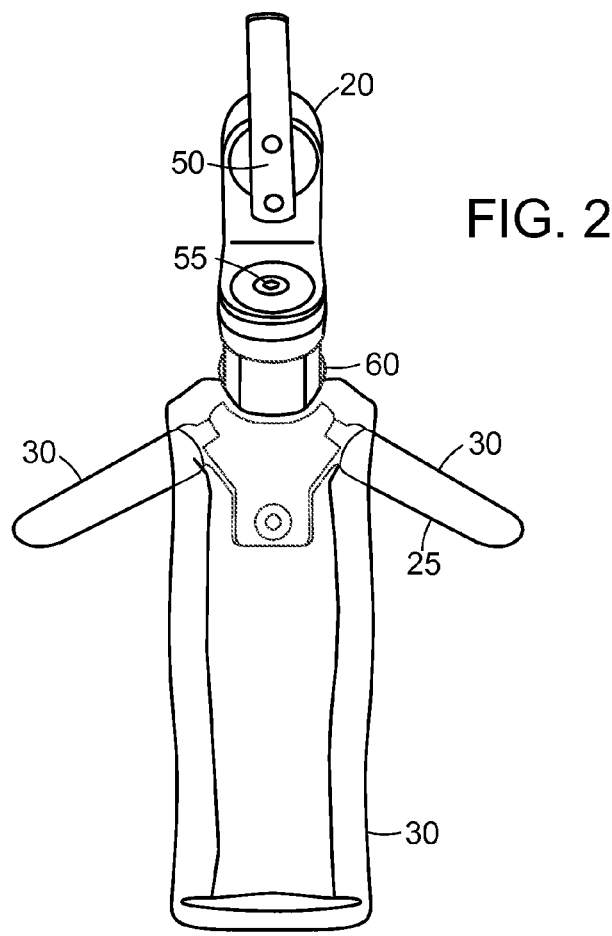
FIG. 2 is a diagram of a portion of the system shown in FIG. 1.
Figure 3:
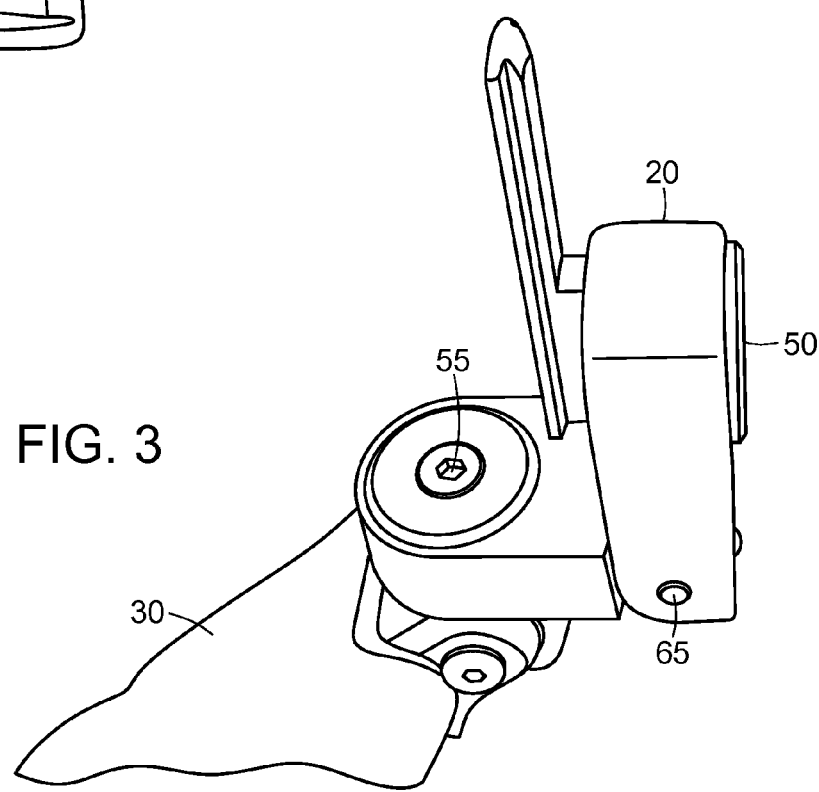
FIG. 3 is a diagram of a portion of the system shown in FIG. 1.
Figure 4:
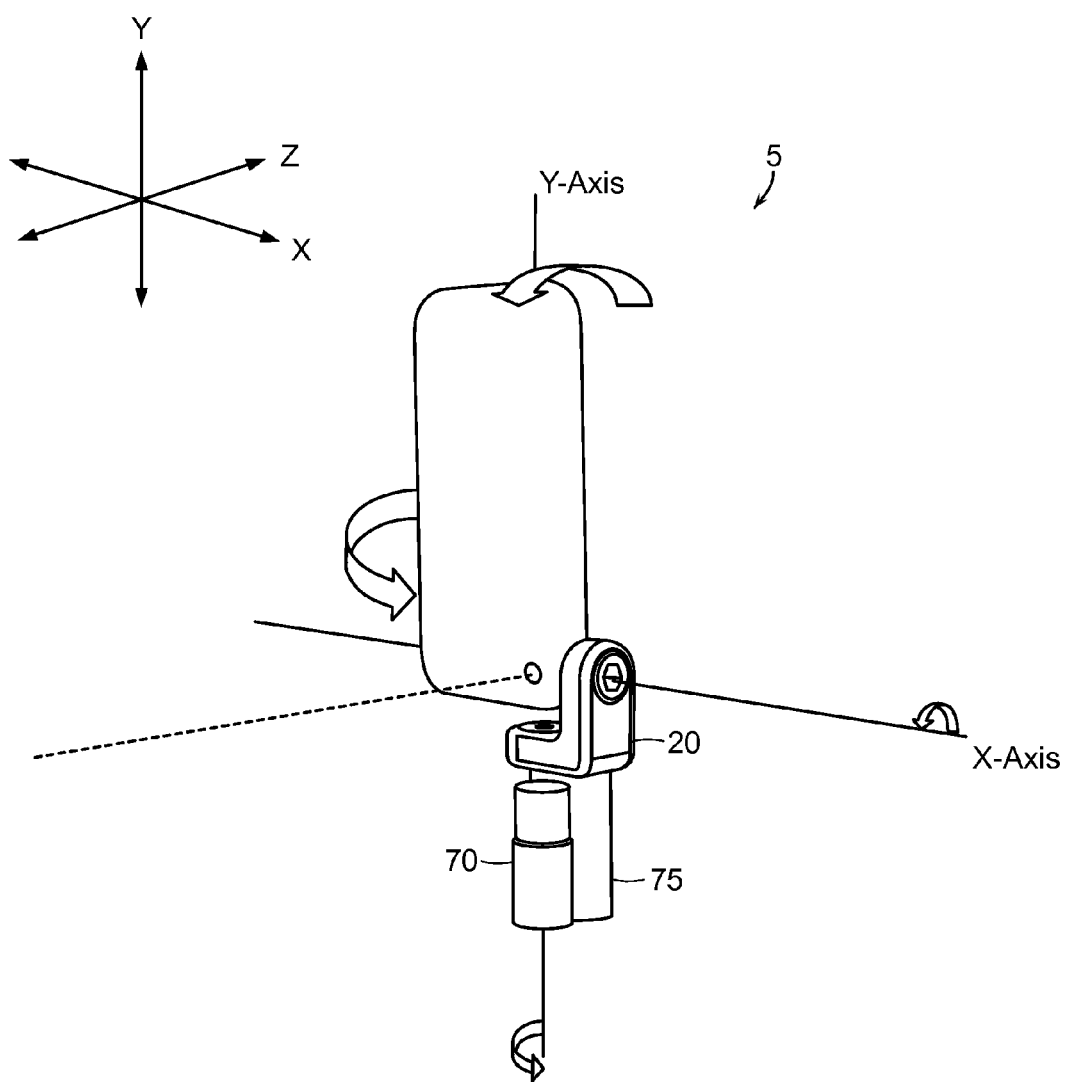
FIG. 4 is a diagram of a system for capturing images.
Figure 5:
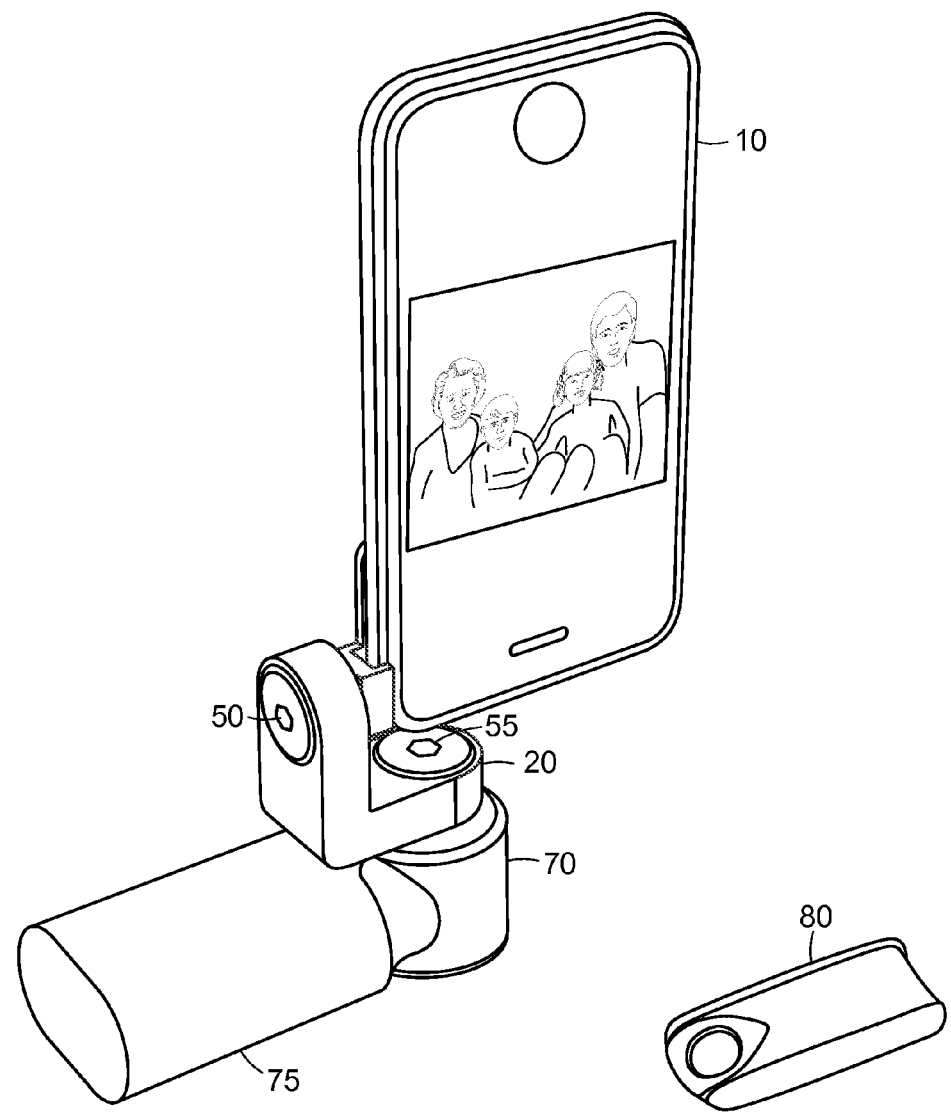
FIG. 5 is a diagram of a system for capturing images.

The application preferably starts with a screen briefly showing the logo, product name, version information, and, after a brief timeout, starts where the user left off in a project, or at the project list on the studio screen if there is no saved state, or if saved state is unusable. A splash screen is not required, and, if used, can vary from that described above. An exemplary splash screen is shown in FIG. 2.

Studio Screen

Figure 8:
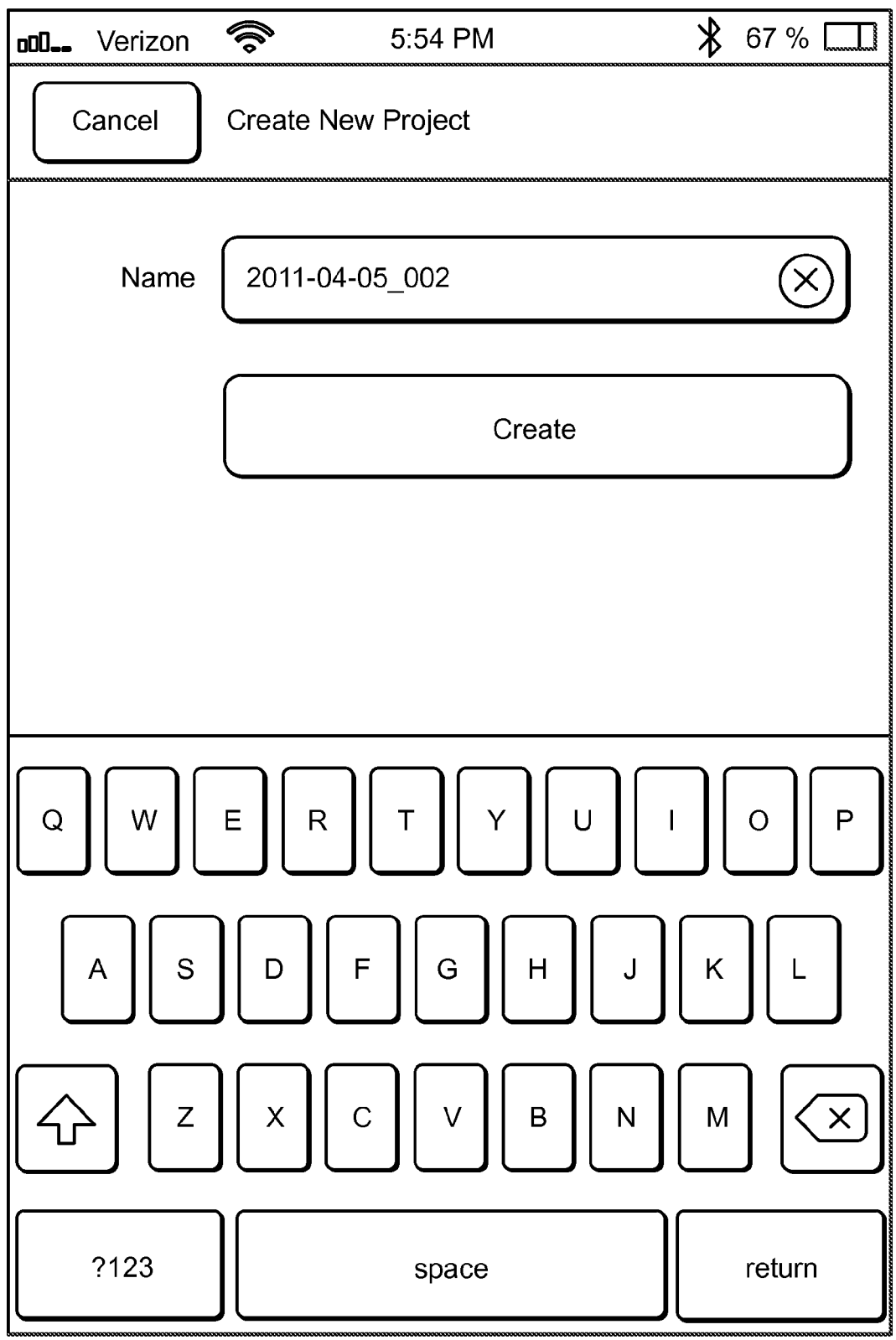

The Studio screen preferably shows a list of projects (e.g., as shown in FIG. 6). If there are no projects, it can show text prompting the user to create a project using a menu on this screen (e.g., as shown in FIG. 8). Projects can organize images, how they are processed and combined (transforms), and the outputs or exports of the projects (e.g., jpg files, QuickTime VR, RAW, etc.). Projects are not required to be single documents. A project can refer to images that are stored in, for example, the system's image database(s). Moving a project can involve a special type of "export" which is an archive containing project data and copies of images imported and/or acquired as the inputs to the project.

A project is preferably a collection of images and compound images. The outputs, or exports, from a project are images in various formats that are, in general, meant to be HDR images and/or panoramas, though, an output could also be a single, unprocessed image. Projects preferably start with either an "import" of images, or by acquiring images (e.g., using the camera 10). At any point in a project, additional images can preferably be imported or acquired. After images are imported or acquired, the user can create an output by processing images (e.g., specifying transforms on images) and/or organizing them into composite images. Composite images can be designated as outputs or exports by specifying formats for the resulting outputs or exports.

Images and Composite Images

Multiple images captured by the camera 10 can be combined into composite images. Composite images can be multiple images from the same perspective combined into a single image, or they can be, for example, multiple images combined, or stitched, into a mosaic, or panorama. In one example, multiple single images are combined into a panorama or HDR image. In other examples, each image in a panorama can be a composite image.

Panoramas are typically multiple images in single or multiple rows. If the rows of a panorama are taken from perspectives covering 360 degrees around a single point, a cylindrical panorama can be produced. Spherical panoramas are also possible.

Operations on Images

There are preferably two kinds of operations on images: transforms and grouping. Transforms can alter an image or compound image, such as a blur filter, perspective shift, etc. The available set of transforms should facilitate creating HDR images and panoramas. Transforms can operate on whole and/or partial images. Operations can be performed by direct manipulation when possible (e.g., dragging images into groups, and context menus enabling a selection of transforms).

Project Screen

Figure 9:
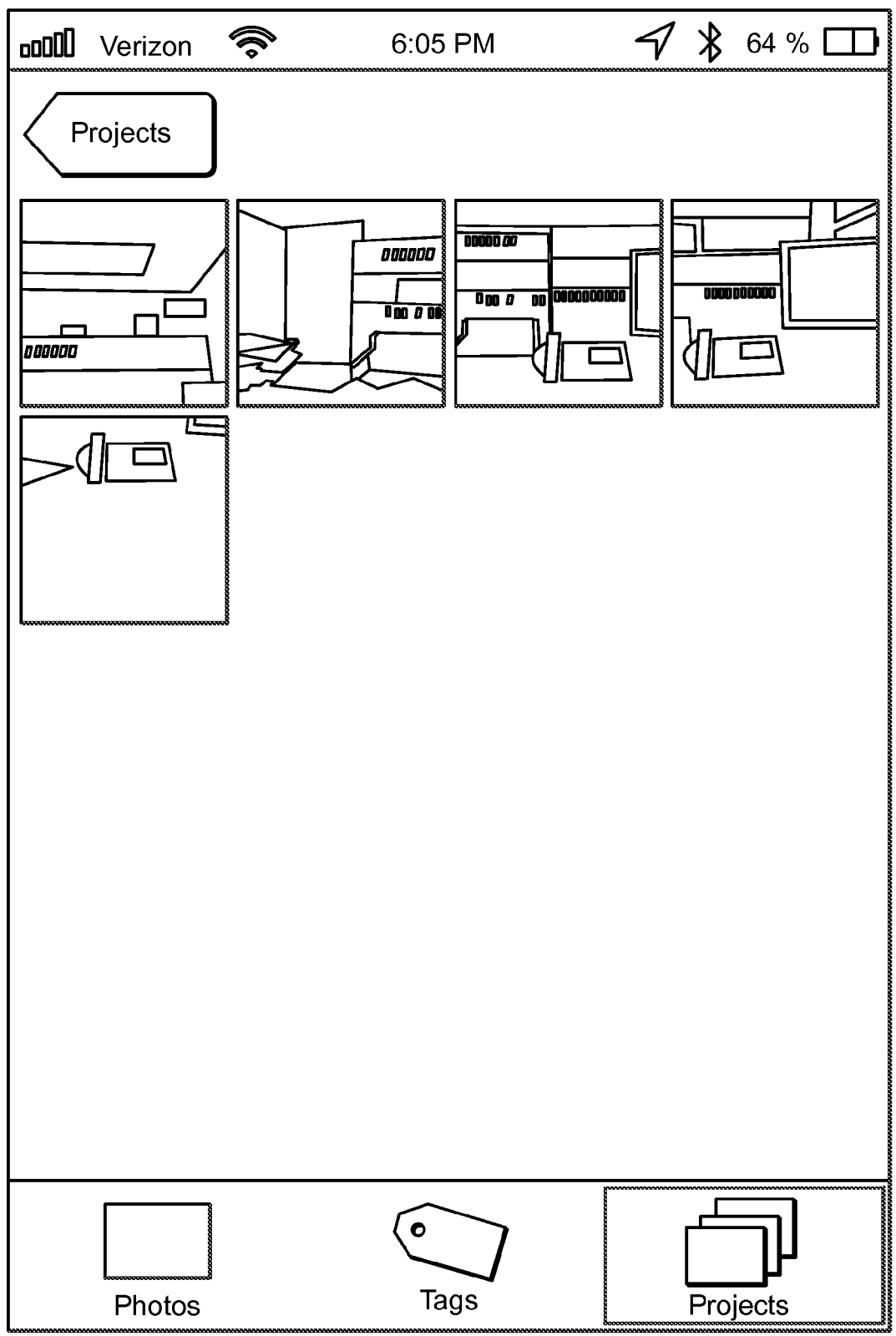

The project screen can display images and composite images in a way that visually represents the content of those entities (e.g., as shown in FIG. 9). For example, individual images can be represented by thumbnail images. Composite images consisting of images taken from the same perspective can be visually represented by a "stack" of thumbnail images. Groups of images comprising a panorama can be shown as thumbnails grouped into the rows of the panorama.

Acquiring Images

Setup of the camera 10 can typically be performed at any time up until a shot is started. Setup of the camera 10 can include leveling the mount 20. To level the mount 20, a level indicator with bubble levels can be shown on a screen of the camera 10, and a tone can be played when the mount is level. If the mount is not level, a warning tone and/or a warning dialog can appear when the user starts a shot. The user can preferably choose to permanently dismiss the warning dialog.

Preferably, the first step in shooting is choosing the type of shot. Shots can be, for example, single frames with one or more images and/or panoramas with multiple frames, with each frame including one or more images. A menu of shot types can be presented, each one a variation on the two basic types. If a previously stored shot type has been chosen, and the user does not want to modify it, the user is ready to start the shot. If the user wants to modify a shot setup or create one from scratch, the user can navigate to the shot setup screen by choosing to modify a shot setup, or to create one. The default setups, and any the user creates, can be stored in the program data, backed up to a remove server (e.g., in the cloud), and are typically not part of a project. Shot setups can preferably be used with any project.

Figure 10:
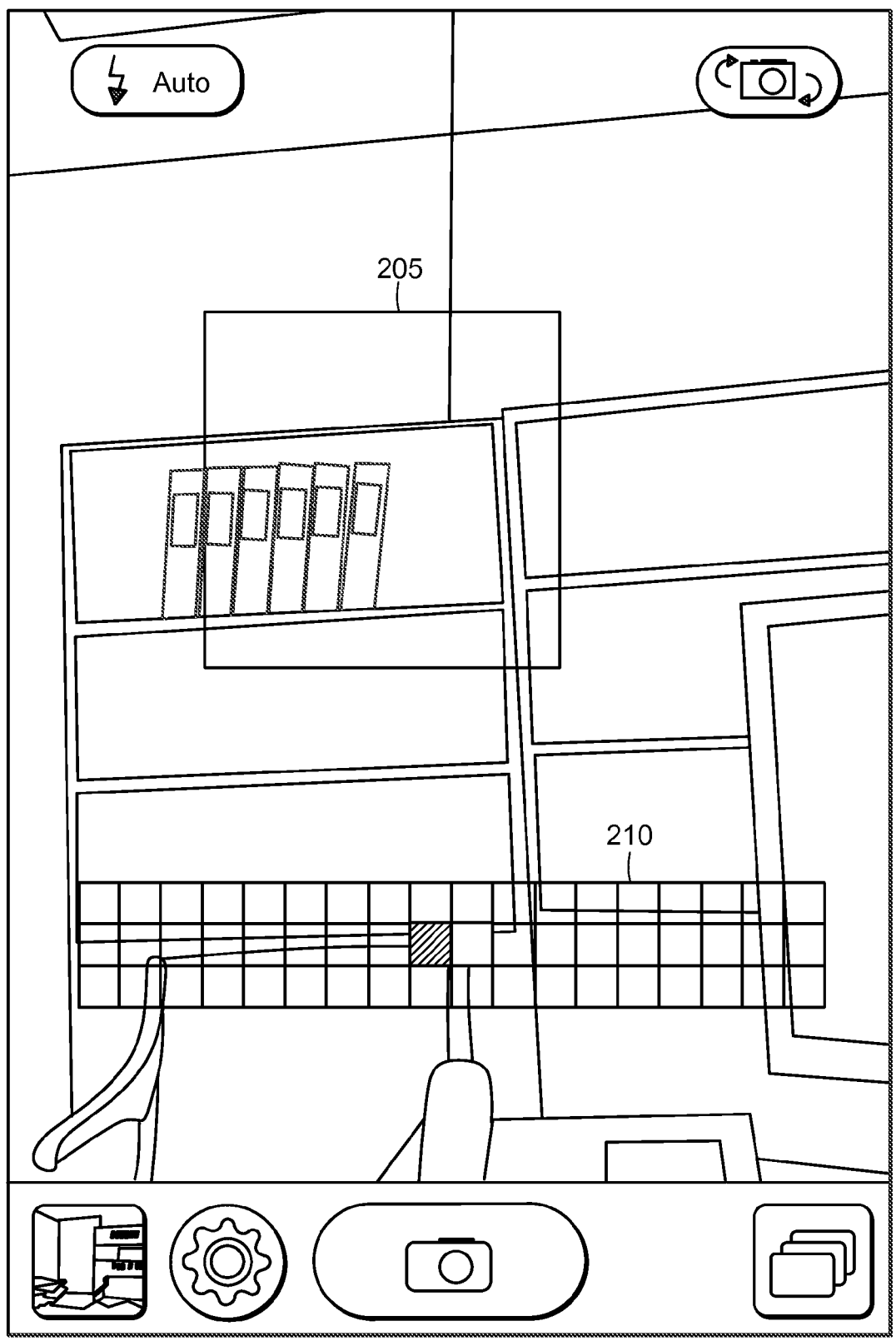
Figure 11:

Using the shot setup screens (e.g., as shown in FIG. 10), the user can preferably edit the programming for a shot. The programming that the user can perform can vary for the different types of shots. For a single frame, the display can show a viewfinder plus controls for setting up a frame consisting of multiple images to produce HDR, super-resolution, and other multiple image effects from a single perspective. When editing the relationship of multiple frames in a panorama, the editor can show the position of each frame of a panorama, information about the setup of the individual frames, and controls to set the parameters for the panorama (e.g., cylindrical or less than 360 degree, number of frames, number of rows).

The shooting screen can be displayed after the shot has been set up. In this screen, the user can preferably configure how the image is captured by the camera. For example, the user can be given the opportunity to release the shutter immediately, after some preset delay, after a specified delay. Other options to capture the image are also possible. For example, the user can capture an image by pressing the call-answer/end-call button on a Bluetooth headset paired with the device containing the camera 10 (e.g., an IPHONE), and/or by using an infrared remote. While a "shutter" has been discussed above, this is not to imply that a physical shutter is required. Other shuttering techniques are possible (e.g., an electronic shutter).

Image Editing

Preferably, every image in a project can be edited. Editing can specify a set of transforms applied to the image. The image application can be configured such that the original image is always retained (e.g., backed up), and transforms can preferably be removed at any later time, reverting the image to its condition before the transform was applied.

Trash Screen

Deleted images are preferably listed in a "trash" list. The images in the trash can be permanently deleted in low resource conditions, or explicitly on the user's command.

Warnings and Error Reporting

The application can be configured to warn users away from performing operations that are not strictly incorrect, but that are unlikely to work or produce a good image. For example, adding images not taken from the same point to a panorama, or not taken from the same perspective to a composite image from which an HDR image can be derived. These warnings should be given throughout the program when the user performs an operation that can be inferred to have an undesirable result, such as deleting an image that was previously selected for saving, and/or creating a shot setup with what could be nonsensical parameters (e.g., too much, or too little overlap, unusual exposure settings, etc.).

Web-Based Application

The functionality described herein can also be implemented on a server that is accessible via the Internet, or other network. For example, a server can be accessed by an IPHONE over a cellular network. The image application can be configured with some differences when implemented as a web-based application. For example, differences in functions in a Web version of the image application (e.g., relative to a locally hosted version of the application) can include specifying a part of an image for applying a transform, showing panels instead of separate screens for lists of projects, groups, etc. Performance requirements and algorithm implementation in web-based versions of the image application can be varied (e.g., as Web servers generally have more computing power than a portable device, more CPU-intense processes can be used).

Organization and Workflow

The "studio" can relate to image creation. One exemplary organizational hierarchy can be: layer>image>canvas>project. A layer is preferably a single image. An image is preferably a set of layers from a single perspective. Layers in the Image might include differences in exposure, focus, etc. The assumption is the layers will be edited and merged down. A canvas is preferably a collection of layers and images that are organized. The assumption is that the images will be stitched and/or merged as a part of a larger image. A project is preferably a collection of layers, images and canvases that are logically organized based on a project. The user can start by creating a new project or opening an existing one. The user can then make the decision to create an image or canvas. At this point, the difference between an image and a canvas is whether or not the camera will be fixed or moved.

The user can preferably now select whether to set the focus, aperture, and exposure settings. Options can include Manual (e.g., each variable is set manually or using the floating target box and the brackets), Recommend (e.g., the image application analyzes the image and makes recommendations on bracketing and settings), and Automatic (e.g., the user can simply operate the shutter and the recommended settings are put in effect based on algorithms that made decisions relating to bracketing, focus, and exposure).

Creating a Canvas

This process is preferably the same as creating an image except that the canvas is preferably defined and the brackets are preferably made based on first sampling the canvas. When the canvas has been sampled the brackets will preferably be set for the composite canvas and applied (if necessary) to the individual images. The canvas can be set manually by moving entering "SetUp" and stepping the camera left and right to the end points and clicking on the shutter. The canvas can be specified as 360 degree Pano (e.g., the camera 10 preferably steps through a full circle to capture images (e.g., 14 steps)), Custom Pano (e.g., the image application preferably instructs the photographer to use the motor control to move the camera to the left and right limits of the image and then press the shutter button), Spherical (e.g., the camera 10 is preferably able to create three rows of images—one row above the ground plane and one below. Setting these rows will comprise of manually panning the camera, perhaps with an audible detent).

Figure 12:
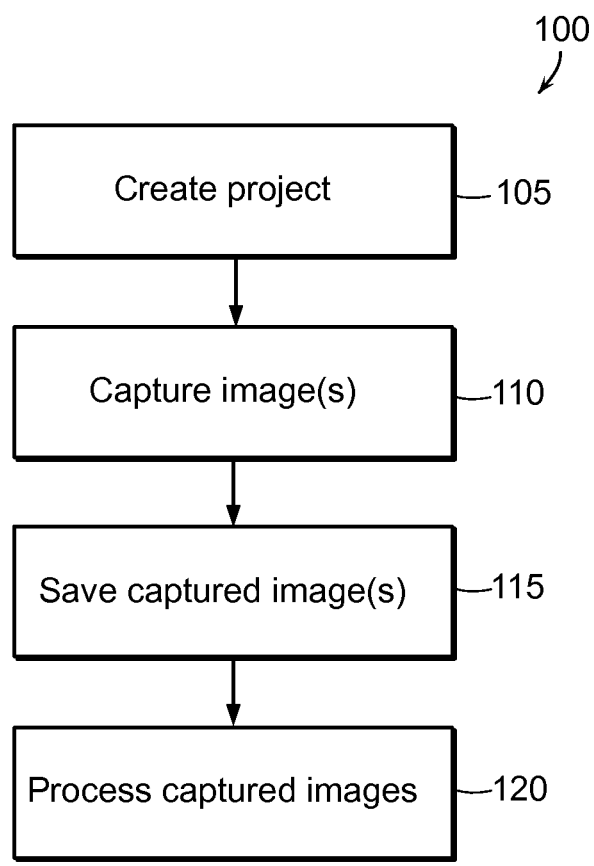
FIG. 12 is a process flow diagram of a process for use with a camera.

In operation, referring to FIG. 12, with further reference to FIGS. 1-11, a process 100 for capturing a panoramic image using the system 5 includes the stages shown. The process 100, however, is exemplary only and not limiting. The process 100 may be altered, e.g., by having stages added, removed, or rearranged.

At stage 105, the user creates a new project in the image application. The project can be given an arbitrary name and/or assigned a name by the image application.

At stage 110, the user captures one or more photographs and/or video using the camera 10. Capture of the photographs and/or video can be done manually and/or under the control of the image application (e.g., being executed in the camera 10).

In a configuration where the user manually positions the camera 10, preferably, the display of the camera 10 includes an alignment icon 205 and alignment grid 210. As each picture is taken, one of the cells in the alignment grid 210 preferably turns a different color to indicate that the corresponding image has been captured. After a first image is captured, the user moves the camera 10 to the next location. Preferably, the user is alerted of the location of the next picture by keeping the alignment icon in the center of the screen of the camera 10. In some embodiments, the alignment grid 210 can change colors when the camera is properly aligned for the next shot. As successive pictures are taken, individual cells of the alignment grid 210 change color to indicate a picture for that location has been captured. The user can preferably see, at a glance, which pictures are missing from the pictures needed to create a composite image.

In a configuration where the camera 10 controls a motorized version of the mount 20, the camera 10 is configured to calculate the positioning of the camera 10. The calculations can be accomplished using, for example, sensors that are present in the camera 10, such as, GPS, accelerometer, compass, facial recognition, etc. The camera 10 can calculate the various positions needed to produce a final composite image and control the mount 20 accordingly. The camera 10 can automatically capture the desired images as the mount 20 moves the camera 10.

At stage 115, images captured by the camera 10 are saved to a memory. The storage can be present locally in the camera 10 and/or can be located remotely over a network connection. Each individual image captured by the camera 10 can be saved as captured, or saved in a bulk manner. The image application can be configured to save some pictures in the camera 10 and to save others (e.g. backup copies) in a remote storage location.

At stage 120, images captured by the camera 10 are processed by the image application. Preferably, the image application merges multiple images captured by the camera 10 in order to create a composite image such as a panoramic, spherical, cylindrical, VR, and/or HDR image. This can be accomplished by, for example, stitching together the multiple images captured by the camera 10. The processing can be performed locally on the camera 10 and/or remotely (e.g., in a remote processor and/or in the cloud).

Other embodiments are within the scope and spirit of the invention.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

While the foregoing application primarily discusses the camera 10 capturing photographs, it will be recognized that video images can also be captured and processed.

It is noted that one or more references are incorporated herein. To the extent that any of the incorporated material is inconsistent with the present disclosure, the present disclosure shall control. Furthermore, to the extent necessary, material incorporated by reference herein should be disregarded if necessary to preserve the validity of the claims.

Further, while the description above refers to the invention, the description may include more than one invention.

What is claimed is:

1. A system for automatic acquisition of still images and generation of a spherical image, the system comprising:
  a motor:
  a camera that includes a lens having an aperture and that includes sensors configured to acquire a present geographical location of the camera including a present orientation of the lens, the camera adapted to calculate a plurality of desired positions of the camera using the present orientation of the lens, the desired positions of the camera including desired orientations of the lens, and to control the motor such that the camera is moved from the present location through the plurality of desired positions;

a tripod configured to support the camera;

a mount configured to be coupled to the tripod and to the camera, the mount including a horizontal pivot that is configured such that the camera is rotatable around a horizontal axis aligned with the aperture of the camera, and the mount including a vertical pivot that is configured such that the camera is rotatable around a vertical axis aligned with the aperture of the camera;

the camera including a memory containing computer readable instructions, that when executed by at least one processor, cause the at least one processor to:
calculate a plurality of desired focuses of the camera;
control the shutter of the camera to capture a plurality of images at the desired focuses;
store the captured images;
generate the spherical image associated with the geographical location using the stored images, and the present geographical location, and
transmit the spherical image to a remote location.

2. The system of claim 1, wherein the processor is included in the camera.

3. The system of claim 1, wherein the computer readable instructions cause the at least one processor to further determine, using the sensor information, the present camera position and lens orientation.

4. The system of claim 1, wherein the sensor information includes one or more of camera location information, azimuth, orientation, acceleration, and sound.

5. The system of claim 1, wherein the camera transmits the captured images to the remote location.

6. A non-transitory computer readable medium for automatic acquisition of still images and generation of a spherical image, the non-transitory computer readable medium including computer readable instructions that, when executed by at least one processor forming part of at least one computing system, cause the at least one processor to:
control the operation of a camera that includes a lens having an aperture and that includes sensors acquiring a latitude and longitude of present geographical location of the camera and present orientation of the lens;
collect information from the sensors in the camera;
process the sensor information to calculate a present position of the camera;
calculate a plurality of desired positions of the camera using the present orientation of the lens, the desired positions of the camera including desired orientations of the lens;
calculate a plurality of desired focuses of the camera;
control a motor attached to the camera to position the camera using the calculated positions, wherein the motor is configured to rotate the camera around a horizontal axis aligned with the aperture of the camera and a vertical axis aligned with an aperture of the camera to the plurality of desired positions such that the camera is moved from the present location through the plurality of desired positions;
capture a plurality of images using the camera at the desired positions and focusses;
store the captured images;
generate the spherical image associated with the geographical location using the stored images, and the present geographical location, and
transmit the spherical image to a remote location.

7. The computer readable instructions of claim 6, wherein the computer readable instructions are executed in a processor included in the camera.

8. The computer readable instructions of claim 6, wherein the computer readable instructions are further configured to cause the processor to capture a plurality of images that are combinable to create a composite image.

9. The computer readable instructions of claim 8, wherein the computer readable instructions are further configured to cause the processor to create a plurality of images that are combinable into the spherical image, the plurality of images being further combinable into a high dynamic range image.

10. The computer readable instructions of claim 8, wherein the computer readable instructions are further configured to cause the processor to combine the plurality of images to create a composite image.

11. A system for automatically generating a spherical image from a plurality of still images, the system comprising:
a camera comprising a lens with focal plane, wireless communications device configured to be in communication with a remote computer, and a plurality of sensors configured to acquire a present azimuth, latitude, and longitude of the camera;
a mount coupled to the camera and supporting the camera, the mount including a motor, a horizontal pivot rotatable by the motor such that the supported camera is rotatable around a horizontal axis aligned with the lens focal plane of the camera, the mount including a vertical pivot rotatable by the motor such that the camera is rotatable around a vertical axis aligned with the focal plane of the camera;
the camera being detachable from the mount and configured to calculate a plurality of desired positions of the camera using a present orientation of the lens, the desired positions of the camera including desired orientations of the lens send instructions to the mount to move a field of view of the camera through a series of directions required to create the spherical image while the camera acquires the plurality of still images such that the camera is moved through the plurality of desired positions, the camera being configured to combine the acquired still images to form the spherical image, associate the present azimuth, latitude, and longitude of the camera with the spherical image, and transmit the spherical image with associated azimuth, latitude, and longitude to the remote computer for storage using the wireless communications device.

12. The system of claim 11, wherein the plurality of sensors are further configured to acquire a present date, time, brightness, acceleration, shutter speed, white balance, and sound.

13. The system of claim 11, wherein the camera further comprises a touch-screen interface.

14. The system of claim 11, wherein the mount further includes a tripod for supporting the mount, the tripod comprising two smaller legs and one larger leg, the smaller legs configured to fold to fit inside the larger leg.

15. The system of claim 11, wherein the mount is configured to communicate with the camera, the remote computer and a remote control using a wireless connection.

16. The system of claim 11, wherein the mount further comprises a detent on the vertical pivot configured to lock the camera in position.

* * * * *